(12) United States Patent
Tsai et al.

(10) Patent No.: US 8,717,944 B2
(45) Date of Patent: May 6, 2014

(54) TRILL OPTIMAL FORWARDING AND TRAFFIC ENGINEERED MULTIPATHING IN CLOUD SWITCHING

(75) Inventors: Chia Alex Tsai, Cupertino, CA (US); Yibin Yang, San Jose, CA (US); Minjie Lin, Sunnyvale, CA (US); Yuchen Zhou, Petaluma, CA (US); Weng Hong Chan, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 60 days.

(21) Appl. No.: 13/593,190

(22) Filed: Aug. 23, 2012

(65) Prior Publication Data
US 2014/0056178 A1 Feb. 27, 2014

(51) Int. Cl.
*H04L 12/28* (2006.01)

(52) U.S. Cl.
USPC .......................................... 370/256; 370/401

(58) Field of Classification Search
None
See application file for complete search history.

(56) References Cited

U.S. PATENT DOCUMENTS

| | | | |
|---|---|---|---|
| 7,808,968 B1* | 10/2010 | Kalmanek et al. | 370/351 |
| 7,903,654 B2 | 3/2011 | Bansal et al. | |
| 8,295,291 B1* | 10/2012 | Ramanathan et al. | 370/400 |
| 2009/0252173 A1* | 10/2009 | Sampath et al. | 370/400 |
| 2011/0267947 A1 | 11/2011 | Dhar et al. | |
| 2011/0273990 A1 | 11/2011 | Rajagopalan et al. | |
| 2012/0044944 A1* | 2/2012 | Kotha et al. | 370/401 |
| 2012/0113871 A1* | 5/2012 | Bulusu | 370/256 |
| 2012/0131216 A1* | 5/2012 | Jain et al. | 709/230 |
| 2012/0213117 A1* | 8/2012 | Banerjee et al. | 370/254 |
| 2012/0275347 A1* | 11/2012 | Banerjee et al. | 370/256 |
| 2012/0320926 A1* | 12/2012 | Kamath et al. | 370/401 |
| 2013/0329584 A1* | 12/2013 | Ghose et al. | 370/252 |

OTHER PUBLICATIONS

"Introduction to TRILL," The Internet Protocol Journal, vol. 14, No. 3, Cisco Systems, Inc., Sep. 2011, pp. 1-32.

* cited by examiner

*Primary Examiner* — Min Jung
(74) *Attorney, Agent, or Firm* — Novak Druce Connolly Bove + Quigg LLP

(57) ABSTRACT

In one embodiment, a plurality of leaf switches that include host facing ports are configured as a cloud switch. An indication of connectivity between the leaf switches of the cloud switch and routing bridges (RBridges) external to the cloud switch may be added to link state packets (LSPs) sent over the at least one logical shared media link. A lookup table may be generated that specifies next hop leaf switches. The generated lookup table may be used to forward frames to one or more particular nexthop leaf switches. Further, traffic engineering parameters may be collected. Equal cost multipath (ECMP) nexthop leaf switches and distribution trees to reach one or more destinations may be examined. Traffic may be distributed across ones of them based on the traffic engineering parameters.

20 Claims, 15 Drawing Sheets

TRILL LOOKUP TABLE FOR DOMAIN 1

| EGRESS NICKNAME | NEXTHOP LEAF SWITCH |
|---|---|
| DOMAIN 2 | SWITCH 3 OR SWITCH 4 |
| R BRIDGE 5 | SWITCH 3 |
| R BRIDGE 6 | SWITCH 4 |
| DOMAIN 3 | SWITCH 3 |
| DOMAIN 4 | SWITCH 3 |
| TREE 1 | SWITCH 3 AND SWITCH 4 |

FIG. 8

TRAFFIC ENGINEERING PARAMETER: LATENCY

| LATENCY IN ns | TO SWITCH 3 | TO SWITCH 4 | TO SWITCH 5 | TO SWITCH 6 |
|---|---|---|---|---|
| FROM SWITCH 1 | 500 | 500 | 500 | 2000 |
| FROM SWITCH 2 | 500 | 1000 | 500 | 500 |

TRILL OPTIMAL FORWARDING AND TRAFFIC ENGINEERED MULTIPATHING IN CLOUD SWITCHING

TECHNICAL FIELD

The present disclosure relates generally to switching, and, more particularly, to the use of Transparent Interconnection of Lots of Links (TRILL) protocol with cloud switch architectures.

BACKGROUND

Layer-2 networks are increasingly being deployed in environments that stress their capabilities. To address these challenges, new protocols and architectures are being deployed in connection with layer-2 networks. One protocol being deployed is Transparent Interconnection of Lots of Links (TRILL) protocol, which implements certain Layer-3 routing techniques, including shortest paths and multipathing, within a Layer-2 framework. One architecture being deployed is cloud switching. Cloud switching architectures (or simply "cloud switches") typically employ a large number of individual switches, interconnected by a high-speed interconnect, and administered collectively as virtual switches. A cloud switch may provide thousands of external ports to support demanding layer-2 networks.

To provide increased performance, it is desirable to implement TRILL protocol in conjunction with a cloud switch architecture. However, a number of issues may be encountered that can introduce inefficiency. One such issue is the possibility of suboptimal inter-cloud switch domain forwarding. Another issue is inefficient selection of nexthops when utilizing TRILL's multipathing capabilities. Accordingly there is a need for improved techniques that may allow TRILL and cloud switch architectures to better interoperate.

BRIEF DESCRIPTION OF THE DRAWINGS

The embodiments described herein may be better understood by referring to the accompanying drawings in which like reference numerals indicate identically or functionally similar elements, of which:

FIG. 8 is an example TRILL lookup table for the first cloud switch domain (RBridge domain) in the example configuration of FIGS. 5 and 7;

FIG. 13 is a table showing example latencies for the configuration shown in FIGS. 4 and 12;

DESCRIPTION OF EXAMPLE EMBODIMENTS

Overview

Figure 1:
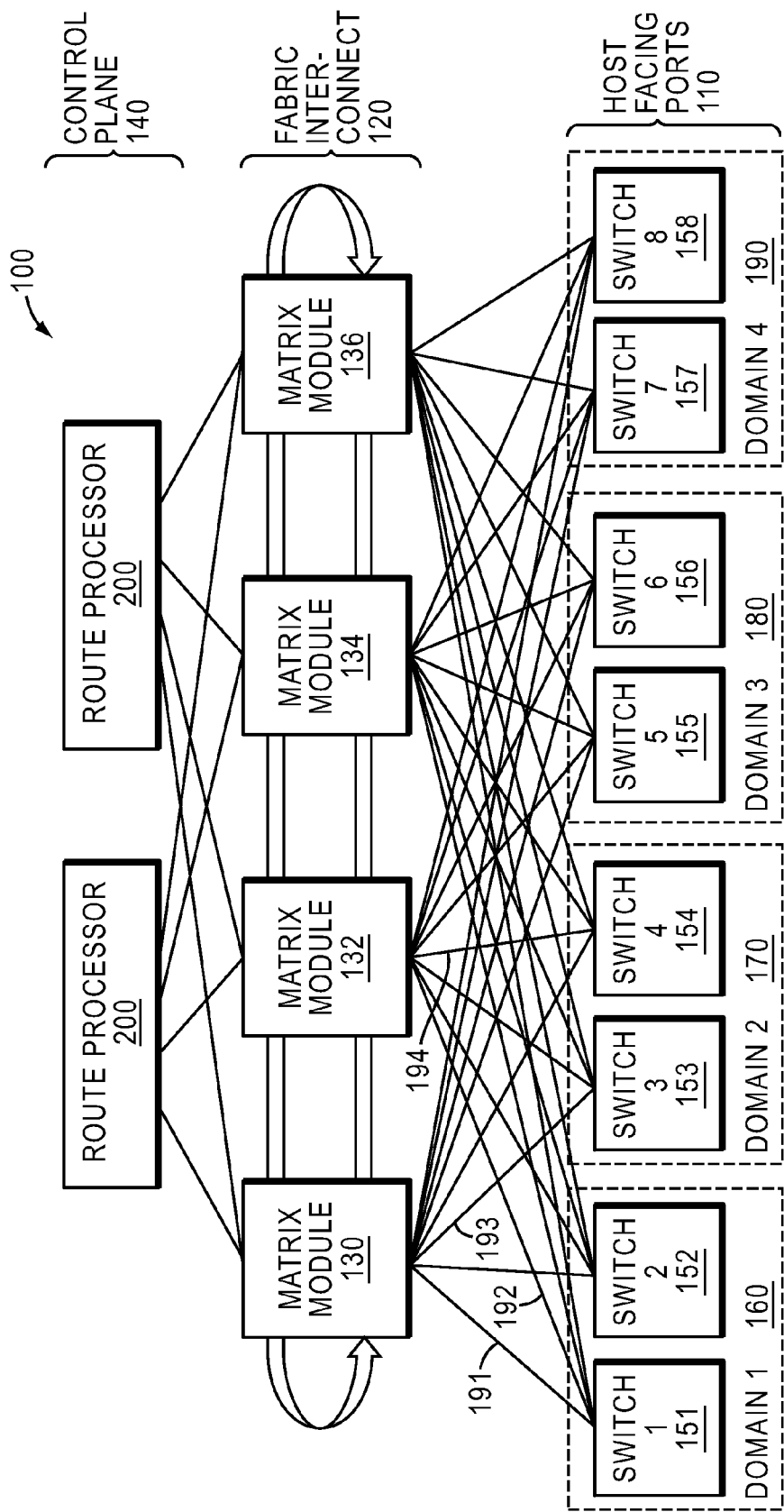
FIG. 1 is a hardware block diagram of an example cloud switch.

According to an embodiment of the present disclosure, a plurality of leaf switches that include host facing ports may be configured as a cloud switch. The cloud switch may include one or more logical shared media links, each leaf switch logically coupled to one of the logical shared media links. An indication of connectivity between the leaf switches of the cloud switch and routing bridges (RBridges) external to the cloud switch may be added to link state packets (LSPs) sent over the logical shared media links. Unicast shortest paths or multi-destination distribution trees are calculated utilizing the added indications. Based on the calculation, a lookup table may be generated that specifies next hop leaf switches. The generated lookup table may be used to forward frames to one or more particular nexthop leaf switches.

According to another embodiment of the present disclosure, a plurality of leaf switches that include host facing ports may be configured as a cloud switch. The cloud switch may include one or more logical shared media links, each leaf switch logically coupled to one of the logical shared media links. Traffic engineering parameters between each of the leaf switches of the cloud switch may be collected. An ingress leaf switch may detect a flow that is destined for a particular destination. When the flow is a unicast data flow, the ingress leaf switch may examine equal cost multipath (ECMP) nexthop leaf switches of the plurality of leaf switches that may be used to reach the particular destination, select a set of ECMP leaf switches, and distribute traffic across the set of ECMP leaf switches based on one or more traffic engineering parameters of the ECMP nexthop leaf switches.

A number of additional embodiments of the present disclosure are also provided further below.

Example Embodiments

A layer-2 network is collection of nodes, such as bridges and switches, interconnected by links that transports data frames using protocols associated with the Data Link Layer of the Open Systems Interconnection (OSI) Reference Model. Layer-2 networks typically provide the ability to establish dedicated point-to-point links between two nodes, as well as to provide shared media links where nodes at least appear to share a common physical media, for example, an Ethernet local area network (LAN). Layer-2 networks generally rely on hardware-based address, such a media access control (MAC) addresses from nodes' network interface cards (NICs), to decide where to forward frames.

Layer-2 networks are increasingly being deployed in environments that stress their capabilities. To address these challenges new protocols and architectures are being deployed in connection with layer-2 networks. One protocol being deployed is Transparent Interconnection of Lots of Links (TRILL) protocol, which implements certain Layer-3 routing techniques, including shortest paths and multipathing, within a Layer-2 framework. Nodes implementing TRILL are referred to as Routing Bridges (RBridges), and may coexist with legacy bridges that do not implement TRILL. RBridges may run an address distribution protocol, such as End System Address Distribution Information (ESADI) protocol, so that each RBridge can announce which hosts (i.e. end user devices) are connected to it. RBridges may also run a link state routing protocol, such as Intermediate System to Intermediate System (IS-IS) protocol, to calculate shortest paths for unicast traffic and delivery trees for multi-destination traffic.

When an RBridge (an ingress RBridge) receives a frame from a source host that is addressed to a destination host connected to another RBridge (an egress RBridges), the frame typically includes an existing header (e.g., an existing Ethernet header or point-to-point protocol (PPP) header), which is referred to hereinafter as the "inner header". The ingress RBridge encapsulates the frame and inner header by adding a TRILL header. The TRILL header typically includes a number of fields, including an ingress RBridge nickname field indicating the ingress RBridge on which the frame entered the portion of the network supporting TRILL, an egress RBridge nickname field indicating the egress RBridge via which the frame is to leave the portion of the network supporting TRILL, a hop count field and a multi-destination flag bit indicating whether the frame is a unicast or multi-destination (e.g., multicast) frame. The TRILL-header encapsulated frame may be further encapsulated within an additional header (e.g., an additional Ethernet header or PPP header) specific to the link the frame is forwarded on, which is referred to hereinafter as the "outer header". The outer header may be stripped off at each hop on the way to the destination host. The TRILL-header, in contrast, is typically maintained, to be stripped by the egress RBridge. Further details regarding TRILL and it use may be found in Perlman et al., "Routing Bridges (RBridges): Base Protocol Specification," RFC 6325, July 2011.

One architecture being deployed to address issues confronted by layer 2 networks is cloud switching. Cloud switching architectures (or simply "cloud switches") typically include a large number of individual switches (referred to herein as "leaf switches") interconnected by a high-speed interconnect and administered collectively as virtual switches. A cloud switch, through its constituent leaf switches, may provide thousands of external ports to support demanding layer-2 networks.

FIG. 1 is a hardware block diagram of an example cloud switch 100. The cloud switch 100 provides an array of host-facing ports 110 distributed among a plurality of leaf switches 151-158 to which external devices (e.g., hosts, external bridges, etc.) (not shown) may be coupled. The leaf switches 151-158 are coupled via a fabric interconnect 120 that includes a plurality of matrix modules 130-136 that provide pathways among the leaf switches. The matrix modules 130-136 operate under the direction of a control plane 140, which includes a plurality of route processors that control forwarding among the leaf switches 151-158. The control plane 140 may organize groups of leaf switches 151-158 into virtual switches, referred to herein as cloud switch domains. The leaf switches 151-158 of each cloud switch domain 160-190 operate in a data plane mode under the control of the control plane.

In order to managing traffic among cloud switch domains, the cloud switch 100 may implement internal logical shared media links among the cloud switch domains. These logical shared media links are referred to herein as "bConnects". Each cloud switch domain is allowed to have only one logical port coupled to a particular bConnect. Cloud switch domains coupled to the same bConnect are permitted to pass data frames between each other through the fabric interconnect 120. Cloud switch domains that are coupled to different bConnects are prohibited from exchanging data frames with each other through the fabric interconnect 120. They may, however, exchange data frames with each other over external connections (i.e. connections external to the cloud switch 100, for example, provided by an external bridge).

Figure 2:
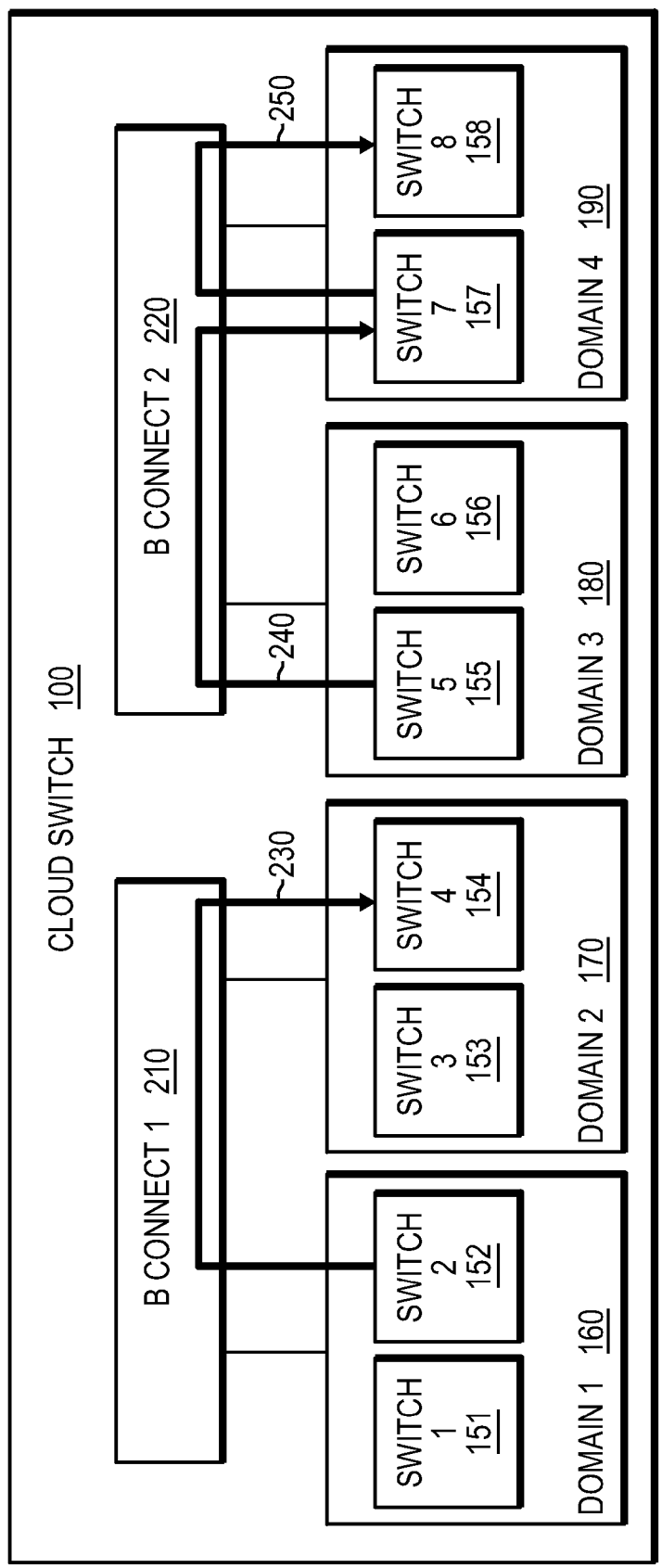
FIG. 2 is a logical block diagram of the example cloud switch of FIG. 1.

FIG. 2 is a logical block diagram of the example cloud switch 100 of FIG. 1, showing internal logical shared media links (bConnects) 210, 220 coupled to certain ones of the cloud switch domains 160-190. The first cloud switch domain 160 and the second cloud switch domain 170 are coupled to a first bConnect 210. Accordingly, first and second leaf switches 151, 152 of first cloud switch domain 160 are permitted to exchange data frames with the third and fourth leaf switches 153, 154 of the second cloud switch domain 170 through the fabric interconnect by virtue of their attachment to a common bConnect. Similarly, the third cloud switch domain 180 and the fourth cloud switch domain 190 are coupled to a second bConnect 220 via logical ports. As such, the fifth and sixth leaf switches 155, 156 of third cloud switch domain 180 are permitted to exchange data frames with the seventh and eight leaf switches 157, 158 of the fourth cloud switch domain 190 through the fabric interconnect by virtue of their attachment to a common bConnect. This type of forwarding among leaf switches of different cloud switch domains is referred to herein as "inter-cloud switch domain forwarding."

To provide increased performance when performing inter-cloud switch domain forwarding, cloud switches may support a TRILL protocol, for example, to take advantage of TRILL's multipathing capabilities. When TRILL is implemented in connection with a cloud switch, the cloud switch domains may operate as RBridge domains.

Figure 3:
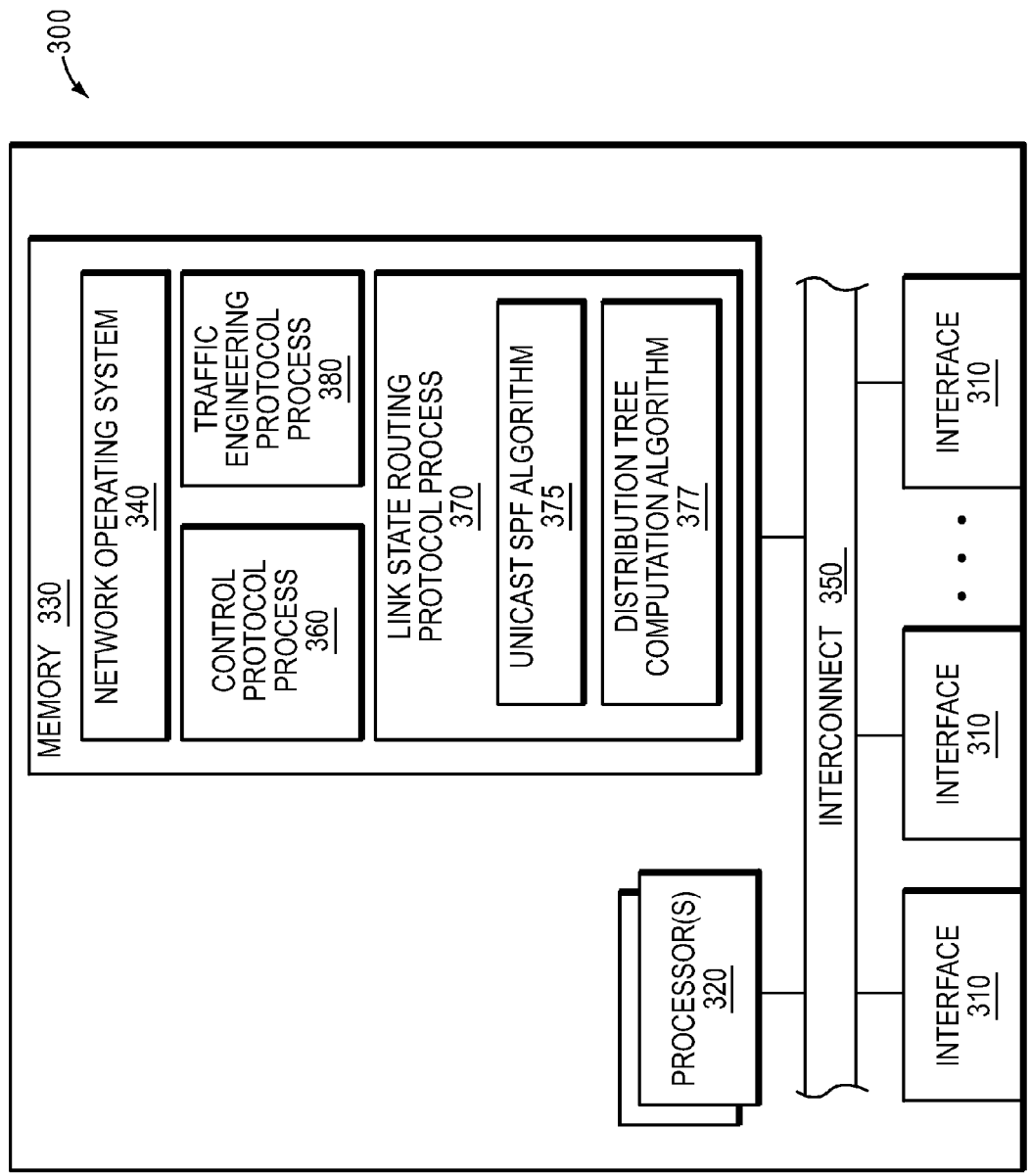
FIG. 3 is a hardware block diagram of an example leaf switch configured to operate with Transparent Interconnection of Lots of Links (TRILL) protocol.

FIG. 3 is a hardware block diagram of an example leaf switch 300 configured to operate with TRILL. The leaf switch 300 may be an example of one of the leaf switches 151-158 of FIGS. 1 and 2. The leaf switch 300 includes a plurality of interfaces 310, one or more processor 320, and a memory 330 coupled by an interconnect structure 350, such as a bus. The interfaces 310 contain mechanical, electrical, and signaling circuitry for connecting to other devices. The interfaces 310 may include host facing ports for connecting to external devices, such as hosts and RBridges. The interfaces may also include ports for coupling to internal components of the cloud switch, for example, to matrix modules. The memory 330 includes a plurality of storage locations for storing software and data structures. The one or more processor 320 include logic configured to execute the software and manipulate data from the data structures. A network operating system 340 may be stored in the memory and executed by the one or more processor 320, to functionally organize the leaf switch 300. Also, a number of protocol processes may be stored in the memory and executed by the one or more processors. The protocol processes may include control protocol processes 360 that, for example, may implement aspects of TRILL and other protocols. One specific control protocol process may be a link state routing protocol process 370 that includes a unicast shortest path first (SPF) algorithm 375 and a distribution tree computation algorithm 377. Another specific control protocol process may be a traffic engineering protocol process 380. Details of such processes are provided further below.

While TRILL may be used in conjunction with a cloud switch architecture, a number of issues may be encountered that can introduce inefficiency. One such issue is the possibility of sub-optimal inter-cloud switch domain forwarding. As discussed above, TRILL generally uses a link state routing protocol, typically IS-IS protocol, to determine how to forward frames. The link state routing protocol typically implements a unicast SPF algorithm 375 to determine the nexthop for unicast forwarding and a distribution tree computation algorithm 377, which generally depends on SPF, to determine nexthops for multi-destination forwarding. However, such algorithms generally are only able to determine nexthop cloud switch domains (RBridge domains), not nexthop switches within those cloud switch domains (RBridge domains). Since cloud switch domains are configured to operate as virtual switches, the leaf switches within a cloud switch domain are typically hidden from the link state routing protocol and, in turn, the unicast SPF algorithm 375 and distribution tree computation algorithm 377. As a result, frames are typically just forwarded to any leaf switch within the nexthop cloud switch domain (RBridge domain), be it the correct leaf switch, or an incorrect leaf switch, and the issue resolved once the frame reaches the cloud switch domain (RBridge domain).

For example, referring to FIG. 2, suppose a unicast frame with a TRILL header is received at an ingress leaf switch 152 and needs to be forwarded to a host (not shown) coupled to an egress leaf switch 154. A link state routing protocol process 370 may determine the next-hop cloud switch domain is the second cloud switch domain 170, and forward the frame to any leaf switch in the second cloud switch domain 170. The frame, by fortunate chance, may be forwarded directly to the egress leaf switch 154 (along pathway 230), resulting in optimal forwarding. However, sometimes chance may be less fortunate.

Suppose a frame with a TRILL header is received at ingress leaf switch 155 and needs to be forwarded to a host (not shown) coupled to an egress leaf switch 158. The link state routing protocol process 370 may determine the next-hop domain is the fourth cloud switch domain 190, and forward the frame to any leaf switch in the fourth cloud switch domain 190. The frame may happen to be forwarded (along pathway 240) to an intermediate leaf switch 157 of the fourth cloud switch domain 190, which is not the egress leaf switch. The intermediate leaf switch 157 may need to redirect the frame to the correct egress leaf switch 158 (along pathway 250), resulting in sub-optimal forwarding. This type of sub-optimal forwarding may undesirably increase latency and consume additional fabric interconnect bandwidth over optimal forwarding.

Another issue encountered when implementing TRILL on a cloud switch is inefficient selection of next hops when utilizing TRILL's multipathing capabilities. As discussed above, TRILL's link state routing protocol, typically IS-IS protocol, is generally not aware of the individual leaf switches within cloud switch domains. Similarly, it is generally not aware of interconnection within the fabric interconnect 120, for example, among matrix modules 130-136. As such, traffic engineering parameters resulting from such connectivity among the individual leaf switches 150-157 and matrix modules 130-136 is typically not considered in TRILL multipathing. Similarly, next hop selection is typically performed without consideration of the ingress leaf switch. This may lead to inefficiently.

For example, referring back to FIG. 1, suppose that, under the direction of a control plane 140 data frames from ingress leaf switch 151 are forwarded to egress leaf switch 154 along a path over link 192, through matrix module 132, and then over link 194, for a total of two internal hops. Further suppose that, under the direction of a control plane 140, data frames from ingress leaf switch 151 are forwarded to egress leaf switch 153 along a path over link 192, through matrix module 132, to matrix module 130. and then over link 193, for a total of three internal hops. Such a configuration may arise due to failure of an internal link (e.g., link 191) or for other reasons. The latency to reach egress leaf switch 153 from ingress leaf switch 151 may be significantly greater than the latency to reach egress leaf switch 154 from ingress leaf switch 151. However, such properties of the connectivity among the individuals switches and matrix modules of the cloud switch 100 are typically not considered in TRILL multipathing, for example, when load balancing among paths. To TRILL, both paths would appear the same, thereby leading to potential inefficiency.

Figure 4:
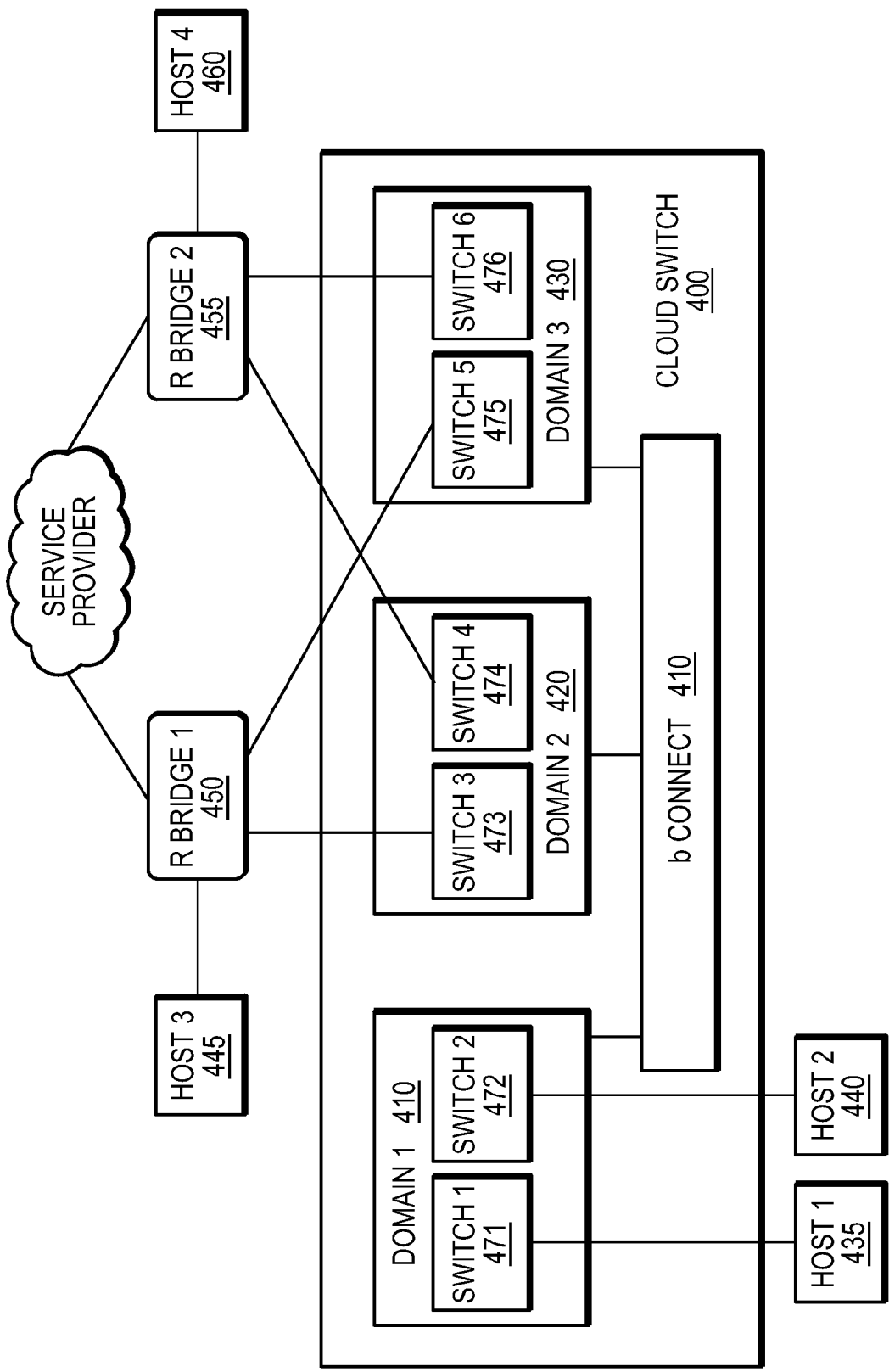
FIG. 4 is a logical block diagram of an example cloud switch, as well as a number of external devices.

Similarly, consider the example showing in FIG. 4. FIG. 4 is a logical block diagram of an example cloud switch 400 that includes a logical shared media link (bConnect) 410 coupled to cloud switch domains 410-430, as well as a number of external devices 435-460. The example arrangement in FIG. 4 differs from FIGS. 1 and 2 to better illustrate a situation where the ingress leaf switch used may affect latency. In this example, the first host 435 is coupled to a first switch 471, while a second host 440 is coupled to a second leaf switch 472, of the first cloud switch domain 410. A first RBridge 450 is coupled to a third host 445 and a second RBridge 455 is coupled to a fourth host 460. The first RBridge 450 is further coupled to third and fifth leaf switches 473, 475, and the second RBridge 455 is further coupled to fourth and sixth leaf switches 474, 476, by links as shown. Suppose an internal path in the cloud switch 400 between the first leaf switch 471 and the fourth leaf switch 474 has greater latency than an internal path between the first leaf switch 471 and the sixth leaf switch 476, for example, due to an increased number of internal hops (not shown) resulting from a situation such as that described above in relation to FIG. 1. In such a case, a path using the first leaf switch 471 and the sixth leaf switch 476 should be preferred. Therefore, it would be desirable for TRILL's link state routing protocol to select the third cloud switch domain 430 as a next hop from the first cloud switch domain 410. Further, suppose an internal path in the cloud switch 400 between the second leaf switch 472 and the sixth leaf switch 476 has greater latency than the internal path between the second leaf switch 472 and the fourth leaf switch 474, again, for example, resulting from a situation such as that described above in relation to FIG. 1. In such a case, a path using the second leaf switch 472 and the fourth leaf switch 474 should be preferred. Therefore, it would be desirable for TRILL's link state routing protocol to select the second cloud switch domain 420 as a next hop from the first cloud switch domain 410. As can be seen, this selection conflicts with the previously described preferable next-hop selection. Depending on which ingress leaf switch a frame arrives on, the optimal next-hop cloud switch domain may differ. By not considering the ingress leaf switch, nexthop cloud switch domain selection may not be optimally determined.

According to embodiments of the present disclosure, these and other shortcomings are addressed by techniques that provide optimal inter-cloud switch domain TRILL forwarding and support for traffic-engineered TRILL multipathing in a cloud switch architecture.

Optimal Inter-Cloud Switch Domain TRILL Forwarding

In a first embodiment, optimal inter-cloud switch domain TRILL forwarding is provided by adding an indication of connectivity between leaf switches and RBridges to link state packets (LSPs) of TRILL's link state routing protocol sent over logical shared media links (bConnects), and, optionally, by adding indications of host media access control (MAC) addresses, group MAC addresses and virtual local area networks (VLANs) associated with leaf switches to ESADI frames sent over the logical shared media links (bConnects). The SPF algorithm 375 and distribution tree computation algorithm 377 are then caused to consider this additional information in their calculations. The addition of indications of connectivity between leaf switches and RBridges to LSPs, and the use by the SPF algorithm 375 and distribution tree computation algorithm 377, may provide for a case where the nexthop cloud switch domain serves a transit role. Likewise, the optional inclusion of indications of host MAC addresses, group MAC addresses and VLANs associated with leaf switches of the cloud switch domain to ESADI frames, and the use by the SPF algorithm 375 and distribution tree computation algorithm 377, may provide for a case where the nexthop cloud switch domain serves an egress role. From the SPF algorithm's and distribution tree computation algorithm's calculations, a TRILL lookup table may be generated that includes nexthop leaf switches within cloud switch domains for both unicast and multi-destination traffic. Using the generated TRILL lookup table, a leaf switch may forward frames to an appropriate nexthop leaf switch, rather than simply to a next-hop cloud switch domain (RBridge domain), preventing non-optimal cloud switch domain forwarding.

Figure 5:
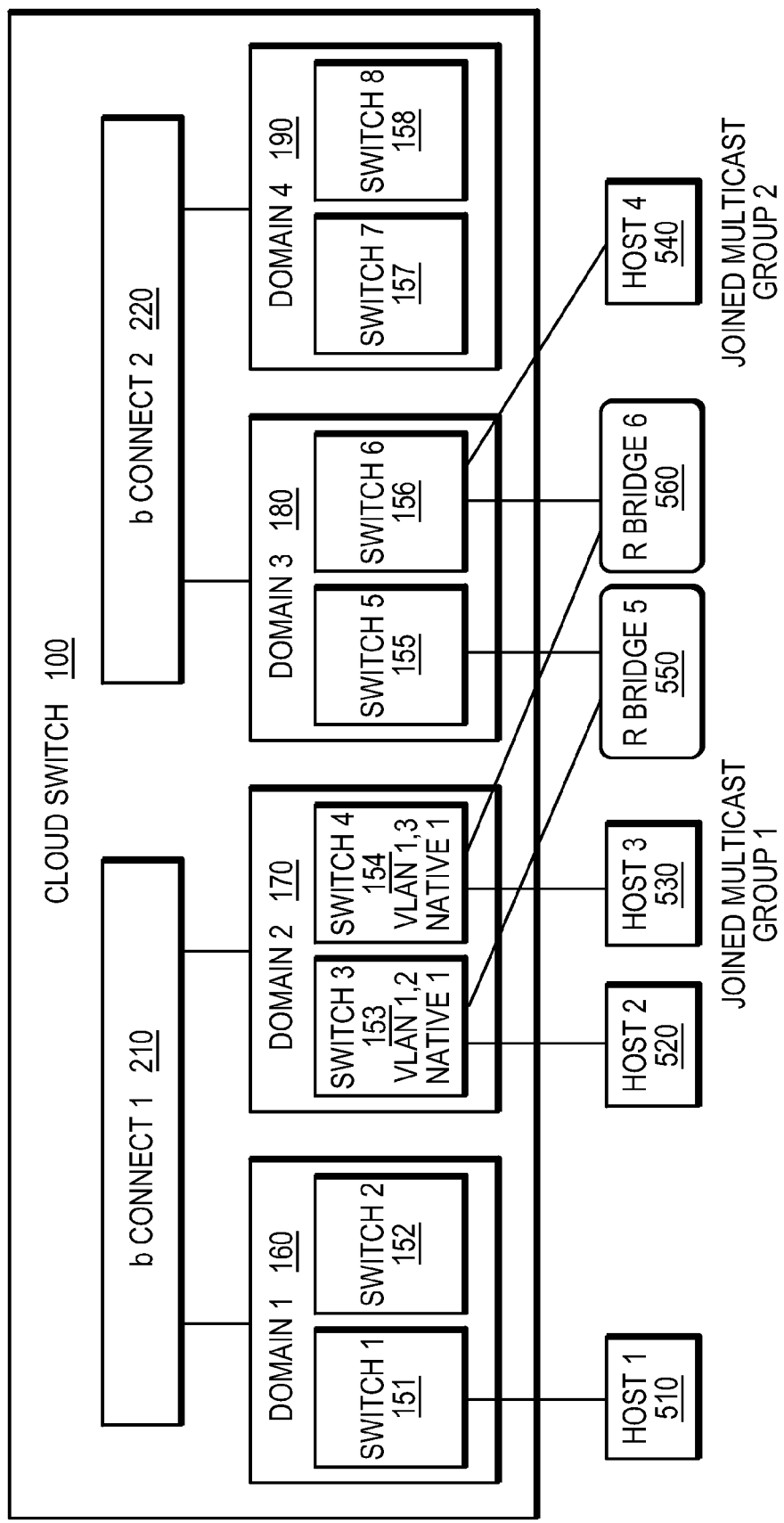
FIG. 5 is a logical block diagram of the example cloud switch of FIGS. 1 and 2, showing example connections to example external hosts and RBridges.

More specifically, consider the case where the nexthop cloud switch domain serves a transit role. FIG. 5 is a logical block diagram of the example cloud switch 100 of FIGS. 1 and 2, showing example connections to example external hosts 510-540 and RBridges 550, 560. In this example, a first host 510 is coupled by a link to a first leaf switch 151 of the first cloud switch domain (RBridge domain) 160. A second host 520 and a third host 530 are coupled by links to the third and fourth leaf switches 153, 154 of the second cloud switch domain (RBridge domain) 170, while a fourth host 540 is coupled to a sixth leaf switch 156 of the third could switch domain (RBridge domain) 180. Similarly, a fifth RBridge 550 is coupled to both the third lead switch 153 and the fourth leaf switch 155, and a sixth RBridge 560 is coupled to both the fourth lead switch 154 and the sixth leaf switch 156. Further, the third leaf switch 153 may be an appointed forwarder for VLAN 1 and VLAN 2, and the fourth leaf switch 154 may be an appointed forwarder for VLAN 1 and VLAN 3. Also the third host device 530 may be a member of a first multicast group, and the fourth host device 540 may be a member of a second multicast group.

In such an example, a nexthop cloud switch domain may serve a transit role in both unicast and multi-destination forwarding. For example, the second cloud switch domain (RBridge domain) 170 may serve a unicast transit role for a frame at the first leaf switch 151 from the first host 510, destined for the fourth host 540 coupled to the sixth leaf switch 156. As can be seen, a frame transiting through the second cloud switch domain (RBridge domain) 170 may reach the third cloud switch domain (RBridge domain) 180 via either the fifth RBridge 550 or sixth RBridge 560. Depending on which RBridge is selected by the SPF algorithm to use to reach the third cloud switch domain (RBridge domain) 180, a frame should be passed directly to a specific one of either the third leaf switch 153 or the fourth leaf switch 154 if optimal forwarding is to occur.

Similarly, the second cloud switch domain (RBridge domain) 170 may serve a multi-destination transit role for a frame from the first host 510 coupled to the first leaf switch 151 destined for the second multicast group that the fourth host 540 is a member. As can be seen, a frame transiting through the second cloud switch domain (RBridge domain) 170 may reach the third cloud switch domain (RBridge domain) 180 via either the fifth RBridge 550 or sixth RBridge 560. Depending on which RBridge is selected by the distribution tree computation algorithm 377 to be used to reach the third cloud switch domain (RBridge domain) 180, a frame should be passed directly to a specific one of either the third leaf switch 153 or the fourth leaf switch 154 if optimal forwarding is to occur.

Figure 6:
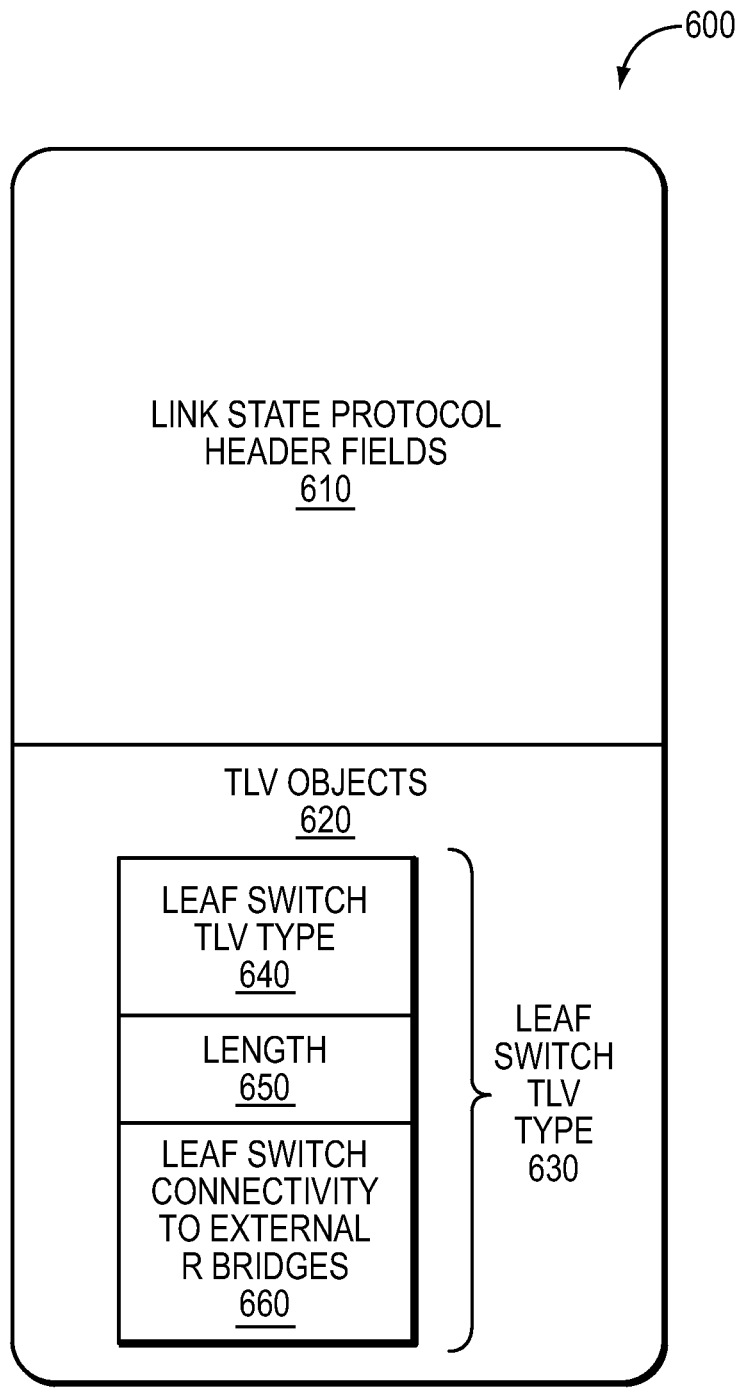
FIG. 6 is a block diagram of an example link state packet (LSP) that includes a leaf switch type-length-value object (TLV)

To be able to consistently direct frames to a proper one of the third leaf switch 153 and the fourth leaf switch 154, an indication of connectivity between leaf switches and RBridges may be added to the LSPs utilized by TRILL's link state routing protocol 370 sent over the logical shared media links (bConnects). Such indication may take the form of a new leaf switch type-length-value (TLV) object. FIG. 6 is a block diagram of an example LSP 600 that includes a leaf switch TLV 630. The LSP 600 includes a number of link state protocol header fields 610, the functions of which are understood to those skilled in the art. The LSP 600 also includes TLV objects 620. The TLV objects 620 may include a new leaf switch TLV 630, indicated by a leaf switch TLV type 640. The leaf switch TLV 630 may store an indication of connectivity between leaf switches and external neighbors, such as RBridges, in a field 660. A length of the leaf switch TLV 630 may be indicated by a length field 650. Referring to the example in FIG. 5, the leaf switch TLV 630 may be utilized by the second cloud switch domain (RBridge domain) 170 to advertise that the fifth RBridge is reachable through the third leaf switch 153 and that the sixth RBridge 560 is reachable through the fourth leaf switch 154.

Figure 7:
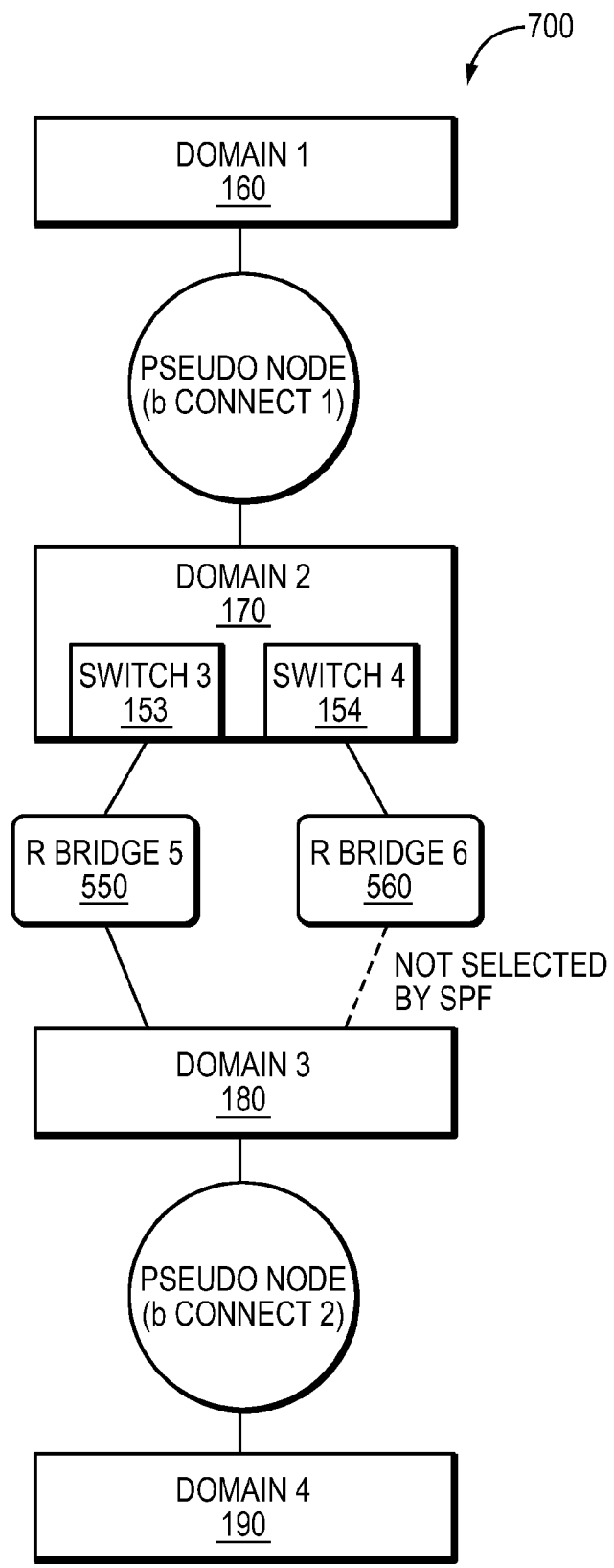
FIG. 7 is a protocol view of the example configuration of FIG. 5, illustrating the computation of nexthops from a first cloud switch domain (RBridge domain)

The SPF algorithm 375 and the distribution tree computation algorithm 377 used by TRILL's link state routing protocol 370 may consider the connectivity information advertised in the leaf switch TLVs 630 in their calculations. FIG. 7 is a protocol view 700 of the example configuration of FIG. 5, illustrating the computation by the SPF algorithm 375 and distribution tree computation algorithm 377 of nexthops from the first cloud switch domain (RBridge domain) 160. For example, when the SPF algorithm determines a nexthop to the fifth RBridge 550, the additional connectivity information advertised by the leaf switch TLVs is utilized to determine that the third leaf switch 153 is connected to the fifth RBridge 550. When a nexthop to the third cloud switch domain (RBridge domain) 180 is calculated, the nexthop leaf switch 153 is inherited, as the previous hop is the fifth RBridge 550. The distribution tree algorithm may similarly consider the connectivity information advertised by leaf switch TLVs 630. For example, if there is a distribution tree rooted at the first cloud switch domain (RBridge domain) 160, knowledge that the third leaf switch 153 is connected to the fifth RBridge 550 and that the fourth leaf switch 154 is connected to the sixth RBridge 560 may be incorporated into the calculation.

From the SPF algorithm and distribution tree computation algorithm's calculations, a TRILL lookup table may be generated that associates an egress nickname with a nexthop leaf switch. FIG. 8 is an example TRILL lookup table 800 for the first cloud switch domain (RBridge domain) 160 in the example configuration of FIGS. 5 and 7. A TRILL forwarding lookup operation may use an egress nickname coinciding with an RBridge/RBridge domain to obtain a specific nexthop leaf switch in most cases, preventing non-optimal inter-cloud switch domain forwarding. However, in a case 810 where the second cloud switch domain (RBridge domain) 170 serves an egress role, the nexthop leaf switch may still not be precisely known, if only leaf switch TLVs 630 are utilized. This may be an acceptable limitation, as optimal forwarding is still achieved in a majority of circumstances. Alternatively, an additional technique may be employed to address this case.

As discussed above, in the case where the nexthop cloud switch domain serves an egress role, an additional technique may optionally be employed, where indications of host MAC addresses, group MAC addresses and VLANs associated with leaf switches of a cloud switch domain are added to ESADI frames. This additional information may then be used by the SPF algorithm 375 and distribution tree computation algorithm 377 to address this case.

Referring back to FIG. 5, a nexthop cloud switch domain may serve an egress role in both unicast and multi-destination forwarding. For example, the second cloud switch domain (RBridge domain) 170 may serve a unicast egress role for a frame from the first host 510 coupled to the first leaf switch 151 destined for the third host 530 coupled to the fourth leaf switch 154. As can be seen, a frame that is to egress on a local link from the second cloud switch domain (RBridge domain) 170 to the third host 530, should be directed to the fourth leaf switch 154, rather than the third leaf switch 153, if optimal forwarding is to occur. Similarly, the second cloud switch domain (RBridge domain) 170 may serve a multi-destination egress role for a frame traveling from the first leaf switch 151 to the first multicast group, of which the third host 530 is a member. As can be seen, a frame that is to egress on a local link from the second cloud switch domain (RBridge domain) 170 to the third host 530, should be directed to the fourth leaf switch 154, rather than the third leaf switch 153, if optimal forwarding is to occur.

To be able to determine the specific leaf switch to be used, inner Ethernet header information may be considered. This information may take the form of host MAC addresses, group MAC addresses and VLANs associated with leaf switches of the cloud switch domain. Three new TLV objects may be introduced to ESADI frames to propagate the information.

Figure 9:
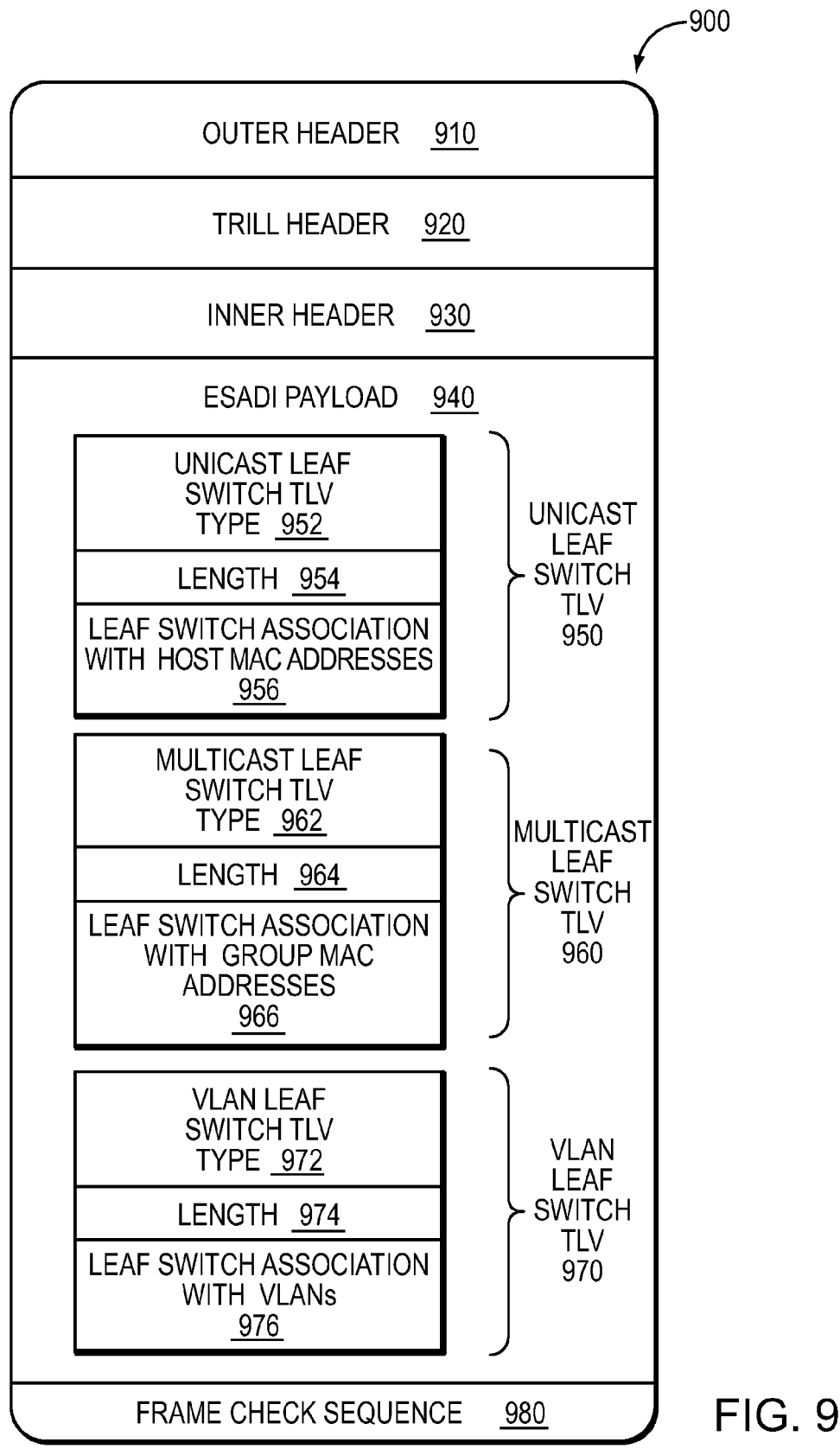
FIG. 9 is a block diagram of an example End System Address Distribution Information (ESADI) frame that includes a unicast leaf switch TLV, a multicast leaf switch TLV, and a virtual local area network (VLAN) leaf switch TLV.

FIG. 9 is a block diagram of an example ESADI frame 900 that includes a unicast leaf switch TLV 950, a multicast leaf switch TLV 960, and a VLAN leaf switch TLV 970. The ESADI frame 900 includes an outer header 910, a TRILL header 920, an inner header 930 and a frame check sequence 980, the functions of which are understood to those skilled in the art. The ESADI frame 900 also includes an ESADI payload 940, which may include the new unicast leaf switch TLV 950, multicast leaf switch TLV 960, and VLAN leaf switch TLV 970.

The unicast leaf switch TLV 950 may include a unicast leaf switch TLV type field 952 that indicates the nature of the TLV, a length field 954 that indicates a length of the TLV, and a value field 956 that indicates one or more associations between leaf switches and host addresses, for example host MAC addresses. Referring to the example in FIG. 5, the unicast leaf switch TLV 950 may be utilized by the second cloud switch domain (RBridge domain) 170 to advertise that the MAC address of the second host 520 is associated with the third leaf switch 153 and that the MAC address of the third host 530 is associated with the fourth leaf switch 154.

The multicast leaf switch TLV 960 may include a multicast leaf switch TLV type field 962 that indicates the nature of the TLV, a length field 964 that indicates a length of the TLV and a value field 966 that indicates one or more associations between leaf switches and group addresses used for multi-destination traffic, for example, group MAC addresses leaned through Internet Group Management Protocol (IGMP) snooping or other techniques. Referring to the example in FIG. 5, the multicast leaf switch TLV 960 may be utilized by the second cloud switch domain (RBridge domain) 170 to advertise that the fourth leaf switch is associated with a group MAC address which the third host 530 has joined.

The VLAN leaf switch TLV 970 may include a VLAN leaf switch TLV type field 972 that indicates the nature of the TLV, a length field 974 that indicates a length of the TLV and a value field 976 that indicates one or more associations between leaf switches and VLANs for which the cloud switch domain (RBridge domain) serves as a forwarder. Referring to the example in FIG. 5, the VLAN leaf switch TLV 960 may be utilized by the second cloud switch domain (RBridge domain) 170 to advertise, for example, that the fourth leaf switch is associated with VLAN 3 that the second cloud switch domain (RBridge domain) 170 is an forwarder.

The additional information provided by the unicast leaf switch TLV 950, multicast leaf switch TLV 960, and VLAN leaf switch TLV 970, may be used in conjunction with the SPF algorithm 375 and distribution tree computation algorithm 377 to generate an extended TRILL lookup table that uses inner Ethernet header information to decide where in a cloud switch domain (RBridge domain) TRILL frames should be decapsulated and egress.

Figure 10:
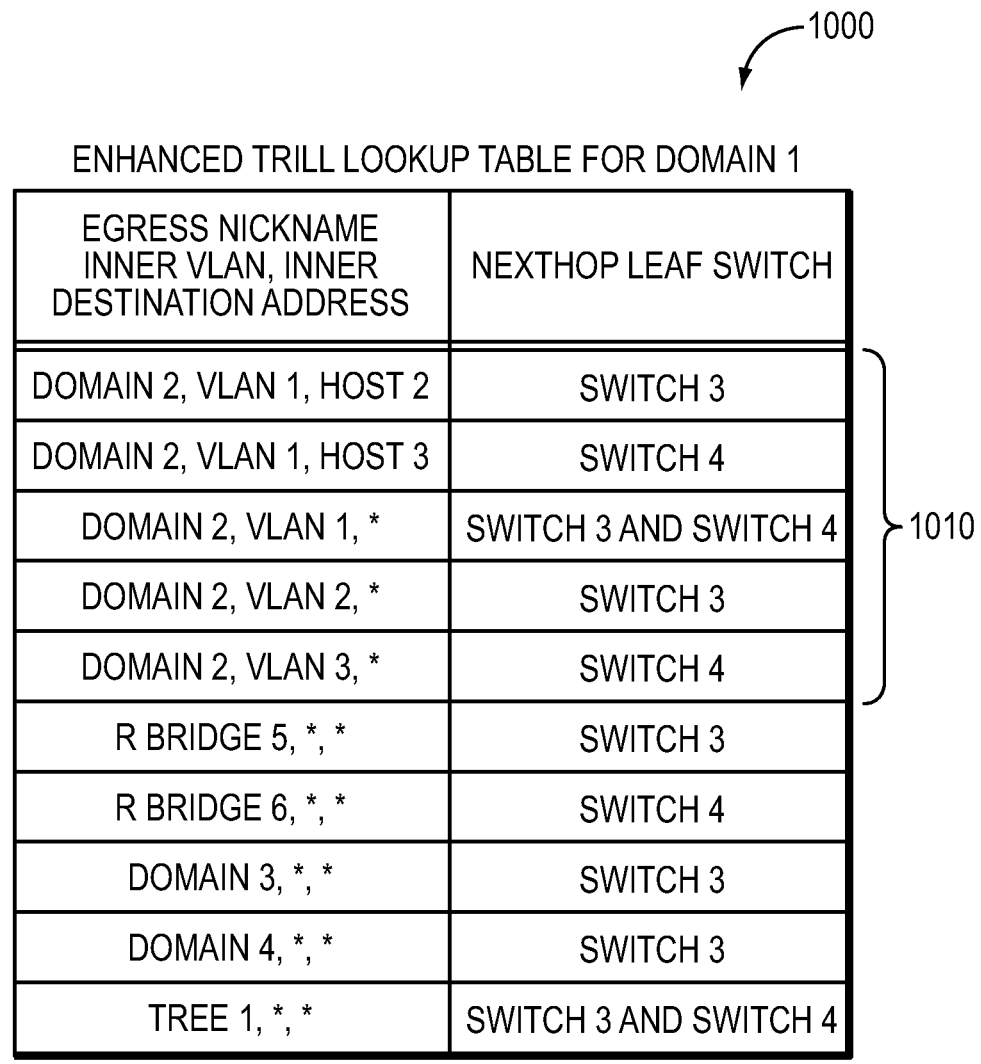
FIG. 10 is an example extended TRILL lookup table for the first cloud switch domain (RBridge domain) in the example configuration of FIGS. 5 and 7.

FIG. 10 is an example extended TRILL lookup table 1000 for the first cloud switch domain (RBridge domain) 150 in the example configuration of FIG. 5 and FIG. 7. The first five rows 1010 of the lookup table 1000 expand the first row 810 of the TRILL lookup table 800 of FIG. 8, and are a result of information added to the ESADI frames. To use the extended TRILL lookup table 1000, a TRILL forwarding lookup operation may be expanded to look to the VLAN indicated in the inner header of the frame being forwarded, and the destination address (e.g. destination MAC address) in the inner header of the frame being forwarded, in addition to the egress nickname coinciding with a RBridge/RBridge domain. As a result, in the case where the second cloud switch domain (RBridge domain) 170 serves an egress role, a specific leaf switch (either the third leaf switch 153 or the fourth leaf switch 154) may now be determined.

Figure 11:
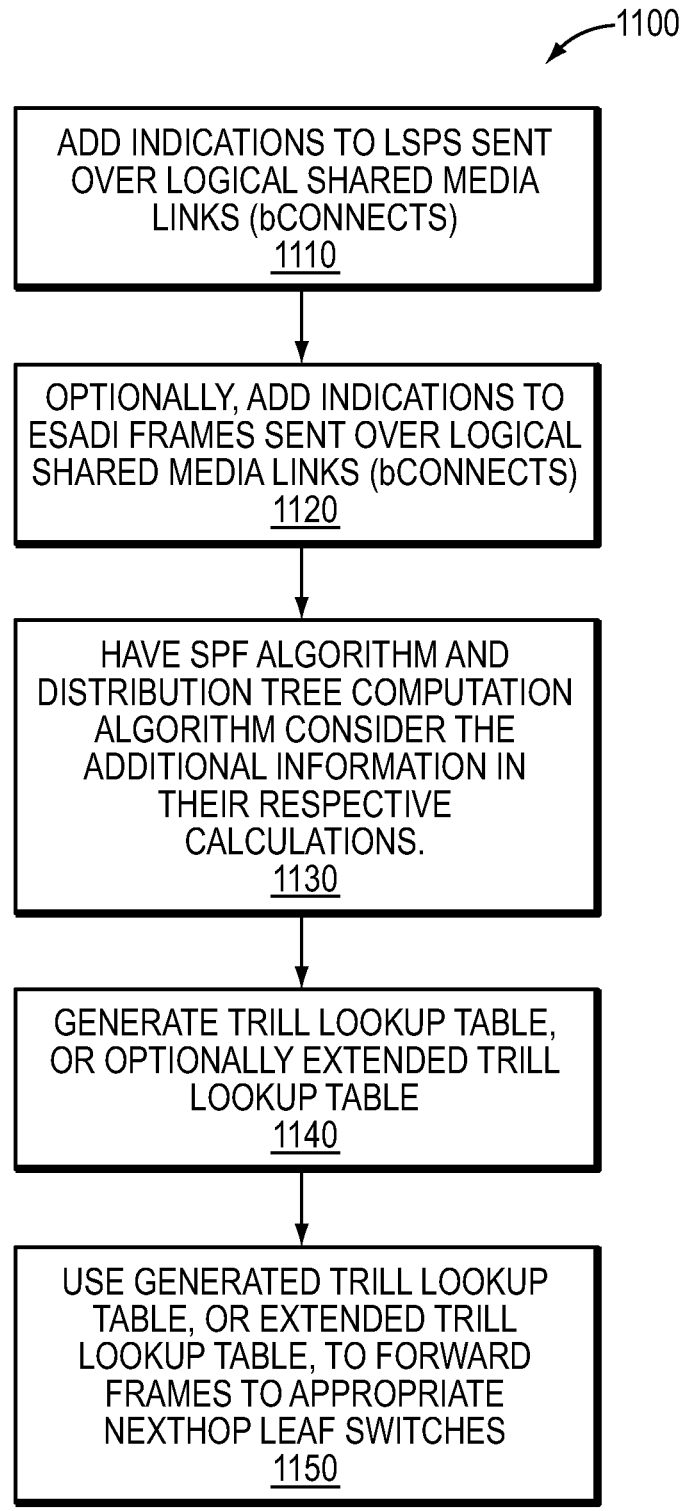
FIG. 11 is a flow diagram of an example sequence of steps for providing optimal inter-cloud switch domain TRILL forwarding.

FIG. 11 is a flow diagram 1100 of an example sequence of steps for providing optimal inter-cloud switch domain TRILL forwarding. At step 1110, indications of connectivity between the leaf switches and RBridges are added to link state routing protocol LSPs sent over logical shared media links (bConnects). As discussed above, such indication may take the form of a new leaf switch TLV object added to the link state routing protocol LSPs. At optional step 1120, TRILL control protocol processes 360 may add indications of host MAC addresses, group MAC addresses and VLANs associated with leaf switches to ESADI frames sent over logical shared media links (bConnects) of the cloud switch 100. As discussed above, such indications may take the form of a new unicast leaf switch TLV 950, multicast leaf switch TLV 960, and VLAN leaf switch TLV 970 added to the ESADI frames. At step 1130, a SPF algorithm 375 and distribution tree computation algorithm 377 calculate unicast shortest paths and multi-destination distribution trees utilizing this additional information. At step 1140, a TRILL lookup table, or optionally an extended TRILL lookup table, is generated. At step 1150, the generated TRILL lookup, or extended TRILL lookup table, is used to forward frames to appropriate nexthop leaf switches, rather than simply next-hop cloud switch domains (RBridge domains), preventing non-optimal cloud switch domain forwarding.

Traffic-Engineered TRILL Multipathing

In a second embodiment, traffic-engineered TRILL multipathing is enabled by collecting traffic engineering parameters for paths between each ingress leaf switch and each egress leaf switch, and performing an equal cost multipath (ECMP) nexthop selection.

Using one or more network measurement and control protocols, such as Precision Time Protocol (PTP), traffic engineering parameters, such as latency, between each ingress leaf switch and each egress leaf switch may be collected. The traffic engineering parameters may be maintained in a data structure. When the ingress leaf switch has a flow destined for a particular destination, either a unicast ECMP nexthop selection algorithm or a multi-destination tree selection algorithm may be applied, depending on the nature of the data flow.

With a unicast ECMP nexthop selection algorithm, the traffic engineering protocol 380 at the ingress leaf switch may compute a set of multiple equal cost egress leaf switches (referred to hereinafter as "ECMP nexthop leaf switches") that provide connectivity to the destination host. If the unicast data flow indicates a desired quality of service (QoS), for example, with a service request specification (RSPEC), a subset of the set ECMP nexthop leaf switches is selected that can satisfy the desired QoS. Then, traffic of the flow may be distributed across the subset of ECMP nexthop leaf switches based on one or more traffic engineering parameters for the ECMP nexthop leaf switches (e.g., latency). For instance, if the flow is sensitive to traffic engineering parameters (e.g., latency), substantially more traffic of the flow may be directed to the ECMP nexthop leaf switch having the better traffic engineering parameters (e.g., lower latency). If the flow is less sensitive to traffic engineering parameters (e.g., latency), traffic may be more evenly load balanced. If the unicast data flow does not indicate a desired QoS (for example, does not have an RSPEC), traffic of the flow may distributed across the entire set of ECMP nexthop leaf switches. As above, if the flow is sensitive to traffic engineering parameters (e.g., latency), substantially more traffic of the flow may be directed to the ECMP nexthop leaf switch having the better traffic engineering parameters (e.g., lower latency), while if the flow is not sensitive, it may be more evenly load balanced across the entire set of ECMP nexthop leaf switches.

Figure 12:
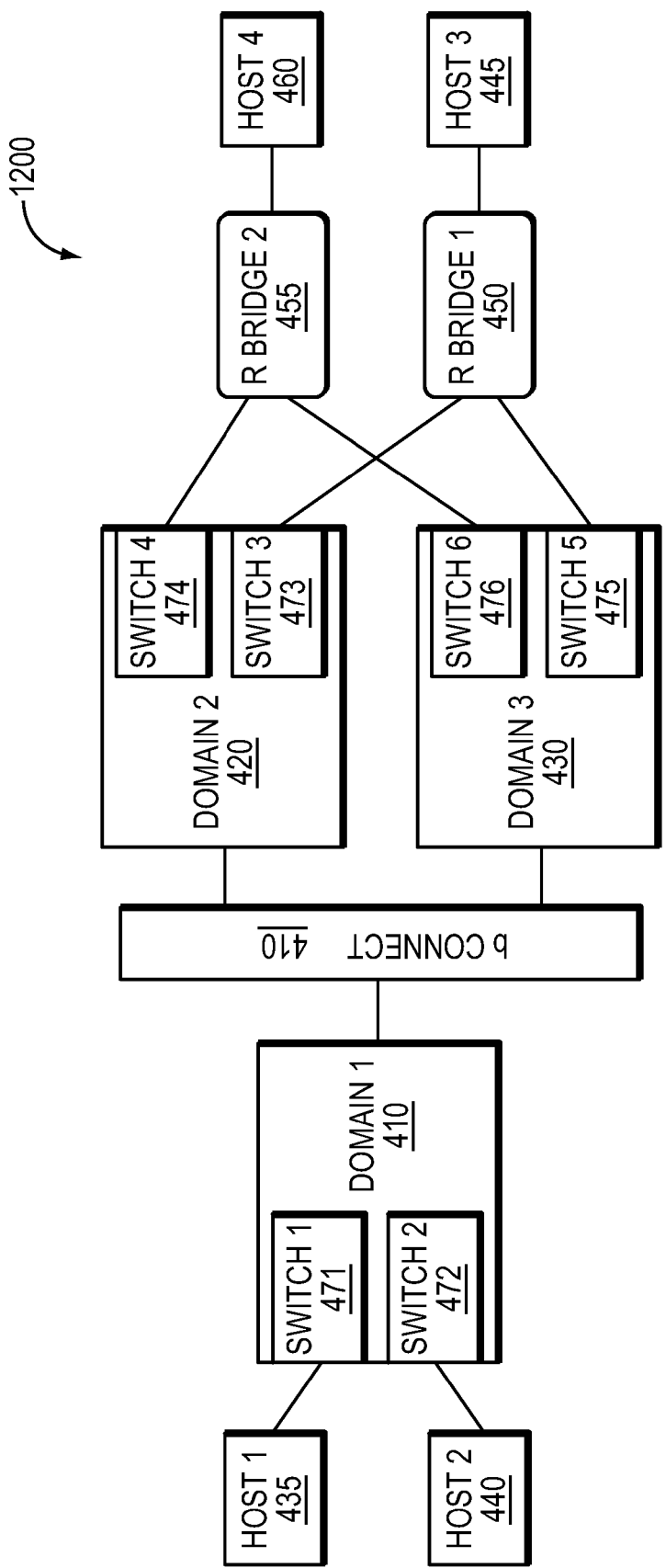
FIG. 12 is a protocol view of the example configuration of FIG. 4, that may assist in illustrating use of a unicast equal cost multi-path (ECMP) nexthop selection algorithm.

FIG. 12 is a protocol view 1200 of the example configuration of FIG. 4, that may assist in illustrating use of the unicast ECMP nexthop selection algorithm. FIG. 13 is a table 1300 showing example latencies for the configuration shown in FIGS. 4 and 12. In this example, the path between the first cloud switch domain (RBridge domain) 410 and the second RBridge 455 via the second cloud switch domain (RBridge domain) 420, and the path between the first cloud switch domain (RBridge domain) 410 and the second RBridge 455 via the third cloud switch domain (RBridge domain) 430 are equal cost paths. Accordingly, it may be determined that for a flow originating at source host 435 and destined for a destination host 460, from ingress leaf switch 471, there are two ECMP nexthop leaf switches: the fourth leaf switch 474 and the sixth leaf switch 476. By applying the above discussed unicast ECMP nexthop selection algorithm, if the flow is sensitive to latency, the fourth leaf switch 474 will be selected to pass substantially more traffic of the flow than the sixth leaf switch 476 since it has lower latency (referring to FIG. 13, a latency of 500 ns verses a latency of 2000 ns). If the flow is not sensitive to latency, the fourth leaf switch 474 may be selected to pass an approximately equal amount of traffic as the sixth leaf switch 476.

Now turning to the use of a multi-destination tree selection algorithm, the traffic engineering protocol 380 at the ingress leaf switch may examine a set of distribution trees that include egress leaf switches that provide connectivity to destination hosts. If the multi-destination data flow indicates a desired QoS (e.g., has a RSPEC), a subset of the distribution trees is selected that can satisfy the desired QoS. Then, the multi-destination traffic of the flow may be distributed across the subset of distribution trees based on one or more traffic engineering parameters (e.g., latency) for the aggregate of leaf switches in each of the distribution trees. For instance, if the flow is sensitive to traffic engineering parameters (e.g., latency), substantially more traffic of the flow may be directed to a distribution tree having leaf switches with better traffic engineering parameters (e.g., lower latency). If the flow is less sensitive to traffic engineering parameters (e.g., latency), traffic may be more evenly load balanced. If the multi-destination flow does not indicate a desired QoS (for example, does not have an RSPEC), traffic of the flow may be distributed across the entire set of distribution trees. As above, if the flow is sensitive to traffic engineering parameters (e.g., latency), substantially more traffic of the flow may be directed to the distribution tree having leaf switches with the better traffic engineering parameters (e.g., lower latency), while if the flow is not sensitive it may be more evenly load balanced across the entire set of distribution trees.

Figure 14:
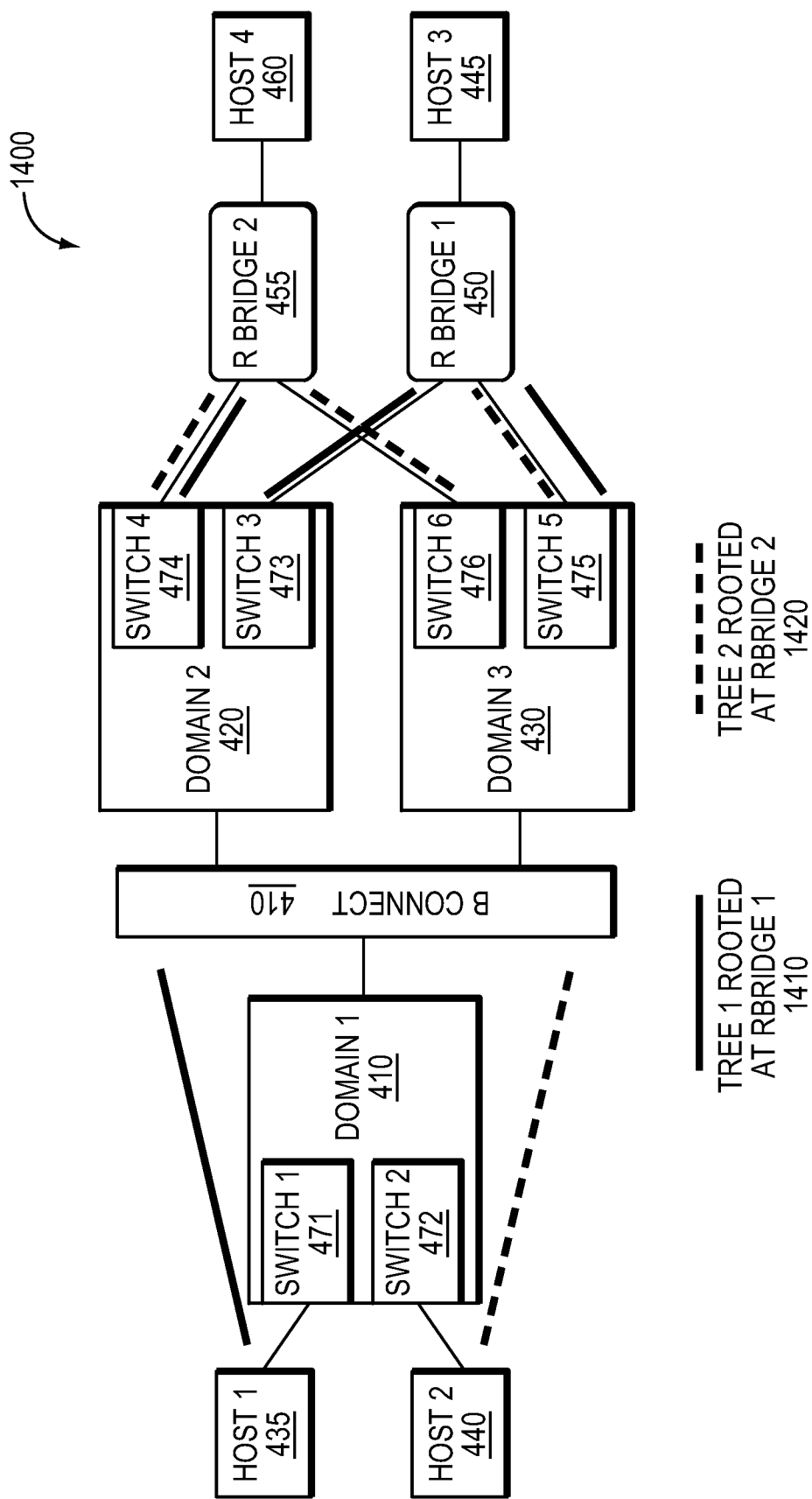
FIG. 14 is a logical view of the example configuration of FIG. 4, that may assist in illustrating use of a multi-destination tree selection algorithm.

FIG. 14 is a logical view 1400 of the example configuration of FIG. 4, that may assist in illustrating use of the multi-destination tree selection algorithm. The logical view 1400 may be considered in conjunction with the table 1300 of FIG. 13 showing example latencies. In this example, a first distribution tree 1410 and a second distribution tree 1420 are rooted at the first RBridge 450 and the second RBridge 455, respectively. A flow originating at a source host 435 coupled to the first cloud switch domain (RBridge domain) 410 has nexthop leaf switches 473, 474 in the first distribution tree 1410 and nexthop leaf switches 475, 476 in the second distribution tree 1420. By applying the above discussed multi-destination tree selection algorithm, if the multi-destination flow is sensitive to latency, the first distribution tree 1410 will be selected to pass substantially more traffic of the flow than the second distribution tree since it has, in aggregate, a lower latency to its leaf switches (referring to FIG. 13, a latency of 500 ns and 500 ns verses a latency of 500 ns and 2000 ns). If the flow is not sensitive to latency, the first and second distribution trees may be selected to pass an approximately equal amounts of traffic.

Figure 15:
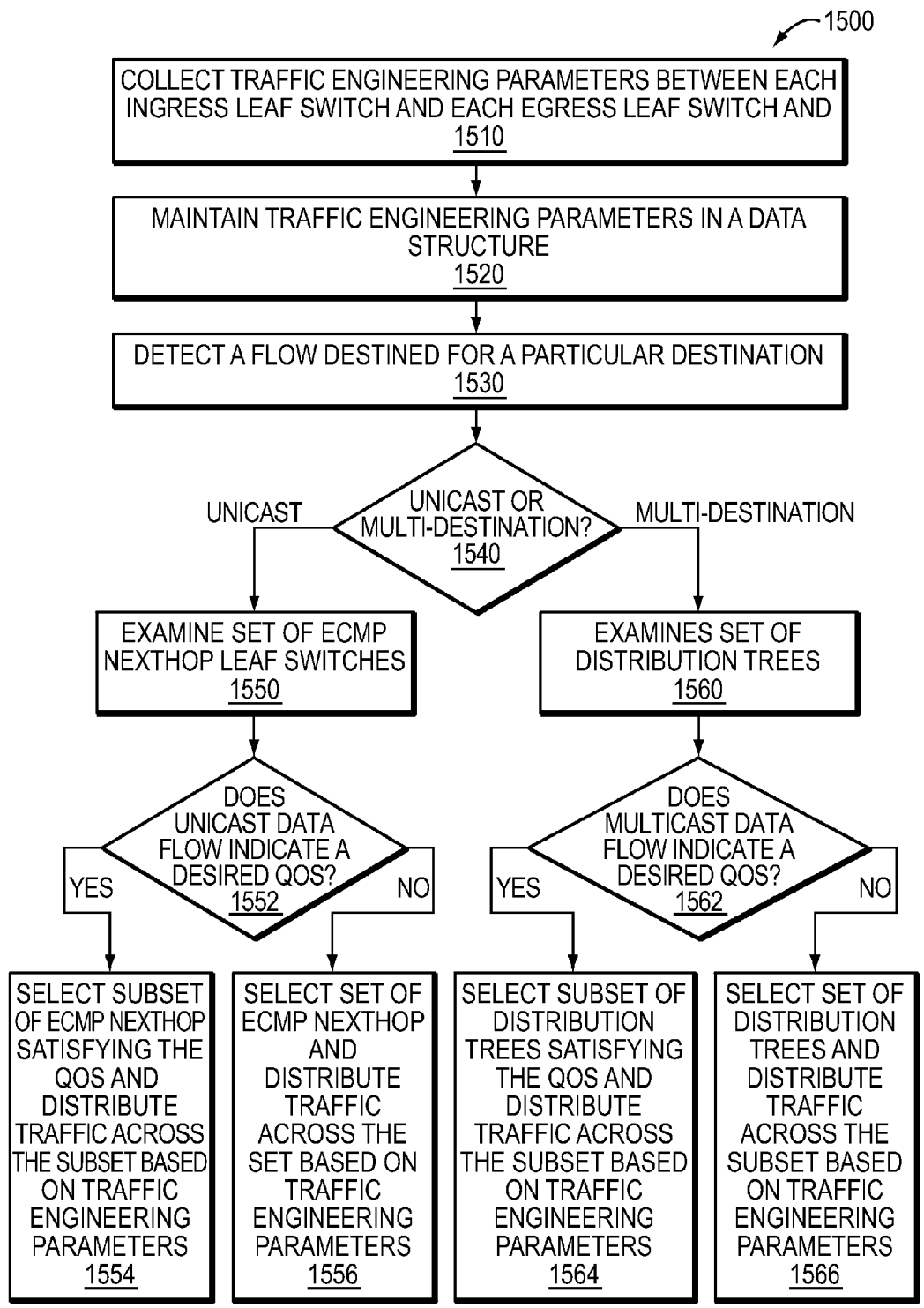
FIG. 15 is a flow diagram of an example sequence of steps for enabled traffic-engineered TRILL multipathing.

FIG. 15 is a flow diagram 1500 of an example sequence of steps for enabled traffic-engineered TRILL multipathing. At step 1510, traffic engineering parameters, such as latency, between each ingress leaf switch and each egress leaf switch are collected. At step 1520, the traffic engineering parameters are maintained in a data structure of a traffic engineering protocol process 380 on the ingress leaf switch. At step 1530, the ingress leaf switch detects a flow destined for a particular destination. At step 1540, depending on the nature of the flow, it is determined whether a unicast ECMP nexthop selection algorithm or a multi-destination tree selection algorithm is applied.

If the unicast ECMP nexthop selection algorithm is applied, at step 1550, the traffic engineering protocol 380 at the ingress leaf switch may compute a set of ECMP nexthop leaf switches. At step 1552, it is determined if the unicast data flow indicates a desired QoS (e.g., has an RSPEC). If so, at step 1554, a subset of the set ECMP nexthop leaf switches is selected that can satisfy the desired QoS (e.g. RSPEC), and traffic of the flow is distributed across the subset of ECMP nexthop leaf switches based on one or more traffic engineering parameters for the ECMP nexthop leaf switches (e.g., latency). If not, at step 1556, traffic of the flow is distributed across the entire set of ECMP nexthop leaf switches.

Alternatively, if the multi-destination tree selection algorithm is applied, at step 1560, the traffic engineering protocol 380 at the ingress leaf switch examines a set of distribution trees that include egress leaf switch that provide connectivity to destination hosts. At step 1562, it is determined if the multi-destination data flow indicates a desired QoS, for example, with a RSPEC. If so, at step 1564, a subset of the distribution trees is selected that can satisfy the desired QoS (e.g. RSPEC), and the multi-destination traffic of the flow is distributed across the subset of distribution trees based on one or more traffic engineering parameters (e.g., latency) for an aggregate of leaf switches. If not, at step 1566, traffic of the flow is distributed across the entire set of distribution trees.

In summary, the present disclosure provides techniques to ensure optimal inter-cloud switch domain TRILL forwarding and to support for traffic-engineered TRILL multipathing in a cloud switch architecture. It should be understood that various adaptations and modifications may be made within the spirit and scope of the embodiments herein. For example, at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
configuring a plurality of leaf switches that include host facing ports as a cloud switch, the cloud switch including one of more logical shared media links, each leaf switch logically coupled to one of the logical shared media links;
adding an indication of connectivity between the leaf switches of the cloud switch and routing bridges (RBridges) external to the cloud switch to link state packets (LSPs) sent over the one of more logical shared media links;
calculating unicast shortest paths or multi-destination distribution trees utilizing the added indications;
generating, based on the calculating, a lookup table that specifies next hop leaf switches; and
using the generated lookup table to forward frames to one or more particular nexthop leaf switches.

2. The method of claim 1, wherein the indication of connectivity added to LSPs includes a leaf switch type-length-value (TLV) object.

3. The method of claim 1, wherein the lookup table is a Transparent Interconnection of Lots of Links (TRILL) lookup table that associates egress nicknames with respective next hop leaf switches of the cloud switch.

4. The method of claim 1, further comprising:
adding an indication of inner header information to End System Address Distribution Information (ESADI) frames sent over the one or more logical shared media links of the cloud switch.

5. The method of claim 4, wherein the indication of inner header information comprises an indication of one or more host media access control (MAC) addresses, group MAC addresses, and virtual local area networks (VLANs).

6. The method of claim 5, wherein the indication of one or more host MAC addresses, group MAC addresses, and VLANs includes a unicast leaf switch type-length-value (TLV), a multicast leaf switch TLV, and a VLAN TLV.

7. The method of claim 5, wherein the lookup table is an extended Transparent Interconnection of Lots of Links (TRILL) lookup table that associates egress nicknames, VLANs, and host MAC addresses or group MAC addresses with respective next hop leaf switches of the cloud switch.

8. The method of claim 1, wherein the flow is a unicast data flow, further comprising:
collecting traffic engineering parameters between each of the leaf switches of the cloud switch;
detecting a flow at an ingress leaf switch that is destined for a particular destination; and
examining equal cost multipath (ECMP) nexthop leaf switches of the plurality of leaf switches that may be used to reach the particular destination;
selecting a set of ECMP leaf switches; and
distributing traffic across the set of ECMP leaf switches based on one or more traffic engineering parameters of the ECMP nexthop leaf switches.

9. The method of claim 1, wherein the flow a multi-destination data flow, further comprising:
examining distribution trees that may be used to reach the plurality of destination hosts;
selecting a set of distribution trees; and
distributing traffic across the set distribution trees based on one or more traffic engineering parameters of an aggregate of leaf switches of the distribution trees.

10. A method comprising:
configuring a plurality of leaf switches that include host facing ports as a cloud switch, the cloud switch including one of more logical shared media links, each leaf switch logically coupled to one of the logical shared media links;
collecting traffic engineering parameters between each of the leaf switches of the cloud switch;
detecting a unicast data flow at an ingress leaf switch that is destined for a particular destination;
examining equal cost multipath (ECMP) nexthop leaf switches of the plurality of leaf switches that may be used to reach the particular destination;
selecting a set of ECMP leaf switches; and
distributing traffic across the set of ECMP leaf switches based on one or more traffic engineering parameters of the ECMP nexthop leaf switches.

11. The method of claim 10, further comprising:
determining the unicast data flow indicates a desired quality of service (QoS), and
wherein the set of ECMP leaf switches is a subset of ECMP leaf switches that satisfy the desired QoS.

12. The method of claim 10, further comprising:
detecting a multi-destination data flow at the ingress leaf switch that is destined for a plurality of destination hosts;
examining distribution trees that may be used to reach the plurality of destination hosts;
selecting a set of distribution trees; and distributing traffic across the set distribution trees based on one or more traffic engineering parameters of an aggregate of leaf switches of the distribution trees.

13. The method of claim 12, further comprising:
determining the multi-destination data flow indicates a desired quality of service (QoS), and
wherein the set of distribution trees is a subset of distribution trees that satisfy the desired QoS.

14. The method of claim 10, further comprising:
maintaining the traffic engineering parameters in a data structure on the ingress leaf switch.

15. An apparatus comprising:
one or more host facing ports;
a logical port coupled to a logical shared media link of a cloud switch;
one or more processors configured to execute one or more software processes; and
one or more memories configured to store software processes including a link state routing protocol process, the software processes when executed by the one or more processors operable to:
add an indication of connectivity to routing bridges (RBridges) coupled to host facing ports to link state packets (LSPs) sent over the logical shared media link,
calculate unicast shortest paths or multi-destination distribution trees utilizing the added indications;
generate, based on the calculation, a lookup table that specifies next hop leaf switches, and
use the generated lookup table to forward frames to one or more particular nexthop leaf switches.

16. The apparatus of claim 15, wherein the indication of connectivity added to LSPs includes a leaf switch type-length-value (TLV) object.

17. The apparatus of claim 15, wherein the lookup table is a Transparent Interconnection of Lots of Links (TRILL) lookup table that associates egress nicknames with respective next hop leaf switches.

18. The apparatus of claim 15, wherein the software processes when executed by the one or more processors are further operable to add an indication of one or more host media access control (MAC) addresses, group MAC addresses, and virtual local area networks (VLANs) to End System Address Distribution Information (ESADI) frames sent over the logical shared media link.

19. The apparatus of claim 18, wherein the indication of one or more host MAC addresses, group MAC addresses, and VLANs includes a unicast leaf switch type-length-value (TLV), a multicast leaf switch TLV, and a VLAN TLV.

20. The apparatus of claim 18, wherein the lookup table is an extended Transparent Interconnection of Lots of Links (TRILL) lookup table that associates egress nicknames, VLANs, and host MAC addresses or group MAC addresses with respective next hop leaf switches.

* * * * *